UNITED STATES PATENT OFFICE.

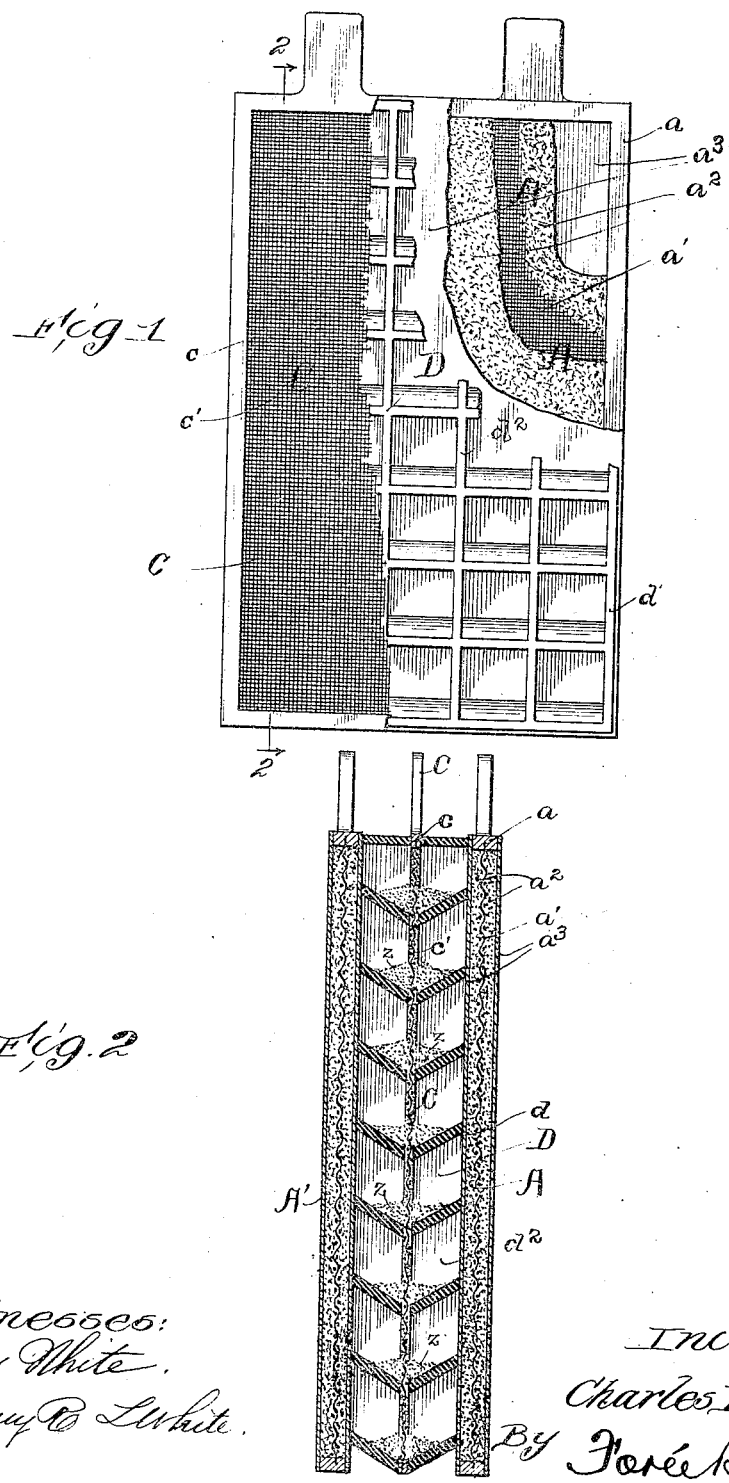

CHARLES B. ASKEW, OF CHICAGO, ILLINOIS.

REVERSIBLE GALVANIC BATTERY.

No. 800,619.            Specification of Letters Patent.            Patented Oct. 3, 1905.

Application filed August 24, 1903. Serial No. 170,525.

*To all whom it may concern:*

Be it known that I, CHARLES B. ASKEW, of Chicago, in the county of Cook and State of Illinois, have invented certain new and useful Improvements in Reversible Galvanic Batteries; and I hereby declare that the following is a full, clear, and exact description thereof, reference being had to the accompanying drawings, which form part of this specification.

The primary object of my invention is to produce a reversible galvanic battery wherein provision is made for mechanically preventing the accumulation at any point within the battery of such a deposit of metallic particles as to deleteriously affect the action of the cell.

In the use of many types of reversible galvanic batteries the chief impediment to perfect action is the accumulation of detached metallic particles at the bottom of the cell in such quantities as to short-circuit the elements and materially reduce the surface area of such elements presented to the electrolyte. For example, in a "zincate" cell, wherein is employed as an electrolyte a zinc solution, such as potassium zincate, this difficulty is present in a marked degree. The zinc deposited on the cathode during the charging operation is of a spongy nature, having little tenacity, and in its deposition it tends to "tree," and so form branching projections of constantly-increasing size, extending outward from the cathode. These trees constantly break off under their own weight and in ordinary batteries fall to the bottom of the cell, often completely filling the space between the elements to a considerable height. When the cell is subjected to rough jarring, as when employed for automobile purposes, this characteristic is aggravated, and the accumulation of the disintegrated zinc is augmented by the breaking or sloughing off of considerable quantities of zinc from the surface of the cathode. The output of the battery is often from this cause quickly reduced to such an extent as to render the battery practically useless. It is with a view to overcoming this difficulty that my invention is primarily designed; and to this end it consists in the provision of a cell wherein the space intervening between adjacent electrodes is divided transversely into a suitable number of compartments, so that the accumulation of disintegrated zinc at any level is proportionate only to the surface area of the cathode presented to the compartment.

Further, my invention consists in so arranging the transverse walls or partitions forming the floors of the compartments that the lateral edge of each partition disposed contiguous to the anode (referred to throughout this specification with reference to the charging operation) is higher than a portion of such partition relatively remote from said element, and, yet further, my invention consists in the details of construction of the particular form of division member hereinafter fully described and constituting an approved and operative embodiment of my invention.

In the accompanying drawings, wherein I have illustrated one application of my invention, Figure 1 is an elevation, broken on several planes, illustrating the association of a division member with two elements of a reversible galvanic battery. Fig. 2 is a vertical section taken on a plane indicated by the line 2 2 of Fig. 1 and illustrating a group of three elements, constituting two couples associated with the division members like that illustrated in Fig. 1.

Referring now to the drawings, A and A' indicate two oxid elements of a zincate battery, which constitutes anodes in charging. C indicates a cathode interposed between the said anodes in insulated relation thereto and serving as the complement of both anodes. In the form of battery illustrated the anode A comprises a metallic supporting-frame $a$, in which is stretched a netting of copper gauze or the like, (indicated at $a'$.) Upon this gauze is supported the active material, such as oxid of copper, (indicated at $a^2$,) said oxid being retained upon the netting by the application of an exterior sheet of parchment paper or like material, (indicated in the drawings at $a^3$.) The cathode C comprises simply a suitable frame $c$, on which is stretched a netting $c'$, of copper gauze, tinned-iron wire properly amalgamated, or other suitable material. These elements, it will be understood, are in operation immersed in a suitable electrolyte, such as potassium zincate, as heretofore described. The space intervening between the anode and cathode elements is divided by suitable means into a series of transversely-extending compartments vertically non-communicating. By the term "transversely," as herein used, I mean a direction extending crosswise of an active face of an element or from its one vertical edge to the other when in normal or working position.

In the specific construction which I have herein shown for illustration, D indicates a division member of insulating material, such as hard rubber, comprising, essentially, a series of transversely-extending partition-walls $d$, suitably supported and spaced apart, as by the vertically-extending end walls $d'$, and adapted when interposed between the anode and cathode elements to extend laterally into contact with both elements and to divide the space therebetween into transverse compartments. The transversely-extending partitions $d$ are so shaped or arranged that the lateral edge of each thereof contiguous to the anode element is in a vertical plane higher than that of some other portion of the partition more remote from said anode. This may obviously be accomplished in various ways; but in the present illustration the partition-walls $d$ are inclined throughout their entire lateral extent downward from their edges, which when in operation are contiguous to the anode element.

If desired, the structure may be strengthened by the provision of vertically-disposed partition-walls $d^2$, which vertically divide the transverse compartments. Such construction, however, is non-essential, though I believe it to be advantageous.

The useful operation of my invention will be as follows: The division of the space intervening between the elements into transverse compartments prevents the disintegrated zinc accumulation from falling clear to the bottom of the cell, as the zinc becoming detached from the portion of the cathode presented to any one compartment falls upon the partition constituting the floor of that compartment and is prevented from further downward progress. Furthermore, it will be seen from an inspection of Fig. 2 that the zinc particles $z$ falling upon the partition-walls $d$ never come into contact with the anode, the elevation of the lateral edge of each partition-wall adjacent the anode above the elevation of a more remote area of said partition forming an effective barrier to prevent the detached zinc from contacting with said anode. The area of the relatively depressed portion of each wall should be sufficient to easily accommodate any quantity of zinc particles which might normally become detached within the area of the compartment. In consequence the short-circuiting of the battery is prevented and the surface area of the anode exposed to the electrolyte is maintained constant irrespective of any ordinary accumulation of disintegrated zinc.

For clearness of disclosure I have herein shown and described the embodiment of my invention in a form adapted to a specific battery structure described; but I desire to be distinctly understood that I do not limit the invention, broadly, either to the specific space-dividing medium illustrated or to the type of battery chosen by way of example.

It will be apparent to those skilled in the art that the teachings of my invention are applicable to any form of battery wherein such accumulations of detached metallic particles occur as to interfere with the proper action of the cell, and that the spirit of the invention is satisfied by the provision of any means whereby the space intervening between the complementary elements is divided transversely into compartments in such a way as to prevent normal accumulations of metallic particles at any level from short-circuiting the elements.

Having thus described my invention, what I claim, and desire to secure by Letters Patent of the United States, is—

1. In a reversible galvanic battery, electrodes spaced apart, and walls dividing the space between said electrodes into closed compartments, two of the walls of each compartment being formed by said electrodes.

2. In a reversible galvanic battery, an anode, a cathode, non-conducting walls extending transversely of and between said electrodes, to form with said electrodes vertically non-communicating compartments.

3. In a reversible galvanic battery, an anode, a cathode, and walls of insulating material extending, relative to the elements, across the face of one thereof in a direction transverse to a vertical line, and dividing the space between said elements into transverse compartments, each of said walls extending laterally into contact with each element.

4. In a reversible galvanic battery, electrodes spaced apart, and walls dividing the space between said electrodes into a plurality of vertically and laterally non-communicating compartments, closed on opposite sides by said electrodes.

5. A division member of a reversible galvanic battery, adapted to be interposed between the battery-electrodes, composed of non-conducting material and comprising walls arranged at angles to each other and all having their like lateral edges in the same plane, to form transversely and vertically separated compartments open laterally, but non-communicating in any direction with each other.

In testimony that I claim the foregoing as my own I affix my signature in presence of two witnesses.

CHARLES B. ASKEW.

In presence of—
GEO. T. MAY, Jr.,
MARY F. ALLEN.